United States Patent [19]

Schumann et al.

[11] 4,456,379
[45] Jun. 26, 1984

[54] PROCESS FOR THE DETERMINATION OF THICKNESS OF ADHESIVE LAYERS OF INNER BOOK BLOCK BACKINGS

[75] Inventors: Frank Schumann, Machern; Hans-Jürgen Richter, Leipzig; Werner Stiefel, Rückmarsdorf; Klaus Fritzsche, Leipzig, all of German Democratic Rep.

[73] Assignee: VEB Kombinat Polygraph "Werner Lamberz" Leipzig, Leipzig, German Democratic Rep.

[21] Appl. No.: 251,436

[22] Filed: Apr. 6, 1981

[30] Foreign Application Priority Data

Jun. 9, 1980 [DD] German Democratic Rep. ... 221666

[51] Int. Cl.³ .............................................. G01B 11/06
[52] U.S. Cl. ................................. 356/381; 356/376; 427/10; 412/11; 412/37
[58] Field of Search ................... 356/1, 381, 382, 390, 356/394, 378, 4, 376; 412/11, 37; 118/712; 427/10

[56] References Cited

U.S. PATENT DOCUMENTS

| 3,137,756 | 6/1964 | Gunther et al. | 356/381 |
| 3,187,185 | 6/1965 | Milnes | 356/381 |
| 3,565,531 | 2/1971 | Kane et al. | 356/381 |
| 3,732,016 | 5/1973 | Deshayes et al. | 356/382 |
| 3,834,819 | 9/1974 | Montone | 356/381 |
| 4,040,738 | 8/1977 | Wagner | 356/1 |

FOREIGN PATENT DOCUMENTS 2842670  4/1980  Fed. Rep. of Germany ...... 356/381

*Primary Examiner*—R. A. Rosenberger
*Attorney, Agent, or Firm*—Jordan and Hamburg

[57] ABSTRACT

The present invention is directed to a process for determining the thickness of adhesive layers placed on book block backings by initially measuring the position of a backing before adhesive is applied to establish a reference point, applying adhesive, then measuring the position of the backing with adhesive to determine the thickness of the adhesive layer. Distances to a standard reference plane may be measured both before and after application of the adhesive, and the differences in respective positions may be used to determine thickness of the adhesive layer. Two such measurements before and after adhesive application are recommended, with the readings averaged to give a mean thickness of the adhesive layer. Measurements are preferably carried out by means of laser beam technology, with the aid of a beam splitter.

9 Claims, 2 Drawing Figures

PROCESS FOR THE DETERMINATION OF THICKNESS OF ADHESIVE LAYERS OF INNER BOOK BLOCK BACKINGS

BACKGROUND OF THE INVENTION

The invention relates to a method for determining the thickness of layers of adhesive immediately after the adhesive is applied upon inner book blocks during the conveyance of the book blocks which are guided in a guiding device in the adhesive portion of a beading press through a device for applying adhesive.

Known machines of this kind do not contain any means for determining the thickness of the layers of adhesive applied to the backings of inner book blocks. Control occurs by visual observation, executed by service personnel at predetermined intervals or executed by measurements on sections through the layer of adhesive after the end of the adhesive process and after sufficient drying of the glue. The application of the adhesive device is usually completed previously and correction is impossible when too large a deviation from desired values is found. The quality of gumming, though, is related directly to the thickness of the glue layer, so that subjective estimates cause differences in the strength of the block, and a corresponding increase of spoilage.

A publication of the company Jagenberg in the program pamphlet of a conference about "Paper and Cardboard Packages in Packaging Systems" discloses that control of glue application may be performed by photoelectric and by capacitive methods. In the first method, the glue is colored. A photocell measures the intensity of the glue layer. The disadvantage of this method is, though, that the color of the board background influences the measurement and thereby falsifies it and the coloring also influences the outer appearance due to its contrast with the usually white paper. Furthermore, this method only determines whether or not glue is present. No quantitative results are possible.

In the capacitive method, measurement is performed on the amount of moisture in the applied strip of glue. Here, the range of tolerance of the glue layer may be fixed by setting an upper and a lower limit in two potentiometers. These methods, though, have the disadvantage that the measuring result does not determine with sufficient precision thickness of a glue layer between 0.5 and 1.5 mm with permissible tolerances of a few tenths of a millimeter because determined values are influenced by disrupting variables, such as differing board colors, differences in the coloring of the glue, or variations of glue composition.

The object of the invention is to obtain a uniformly high quality of adhesion and to prevent waste by determining the thhickness of the adhesive.

SUMMARY OF THE INVENTION

The invention is based upon the task to directly determine the thickness of the adhesive immediately after the adhesive is applied in order to guarantee uniform soundness of the adhesively bonded book block due to the dependence of quality of adhesive on the thickness of the applied adhesive layer. In this case, influencing parameters caused by the edges must be taken into account in order to guarantee unfalsified results of measurements. The task is solved according to the invention by a process where an average value of glue thickness is formed in an amplifying, calculating and reading unit from characteristic values which are obtained by data determination at two stationary measuring positions I and II upon at least one data plane prior to application of adhesive upon the surface of the adhesive layer as well, and when so needed, upon data planes after the application of the adhesive. The data are evaluated, taking into account by mathematical relationship, parameters caused by the influence of the edges, as for instance guidance, pliancy in clamping and conveyance means or wear at the miller for the rear of the backing of the book block. For the evaluation in the amplifying, calculating and reading unit, the following characteristic values are obtained:

1. Test value(s) upon one data plane, for instance the lower edge of the clamping and transport means, in measuring position I, $KP_{1V}$ and $KP_{2V}$, which are fixed exactly by known means at the distance from the edge of the book block prior to applying adhesive.
2. Test value(s) upon the unglued book block backing $KB_{1V}$ and $KB_{2V}$ in measuring position I.
3. Test value(s) upon one data plane, for instance the lower edge of the clamping and conveyance means, in measuring position II after applying adhesive, $KP_{1N}$ and $KP_{2N}$.
4. Test value upon the surface of the adhesive layer, applied to the book block backing in measuring position II, $KB_{1N}$ and $KB_{2N}$.

The thickness of the layer is calculated according to the following relationship:

$$S_1 = KB_{1V} - KB_{1N} - (KP_{1V} - KP_{1N})$$

$$S_2 = KB_{2V} - KB_{2N} - (KP_{2V} - KP_{2N})$$

The average of these two terms is calculated and read as the thickness of the layer.

The regulatory measuring processes, in other words the fixing of the measuring positions, are preferably controlled by position sensors. A convergent light beam is preferably used as an emitter of measured values for the determination of glue thickness, which is directed at an angle of incidence onto the individual locus of measurement and is directed towards a photoelectrical receiving device. Here, a system of lenses is disposed between the source of light and the place to be tested, and another system of lenses is disposed between the place to be tested and the photoelectrical receiving station.

Another advantageous characteristic of the method is characterized by making the beams of each measuring array capable of being commonly and identically deflected. This makes it possible to also determine the layer thickness of the adhesive in a direction across the motion of the book block.

The invention is explained in detail below by the description of an embodiment.

DETAILED DESCRIPTION OF A PREFERRED EMBODIMENT

Figure 1:
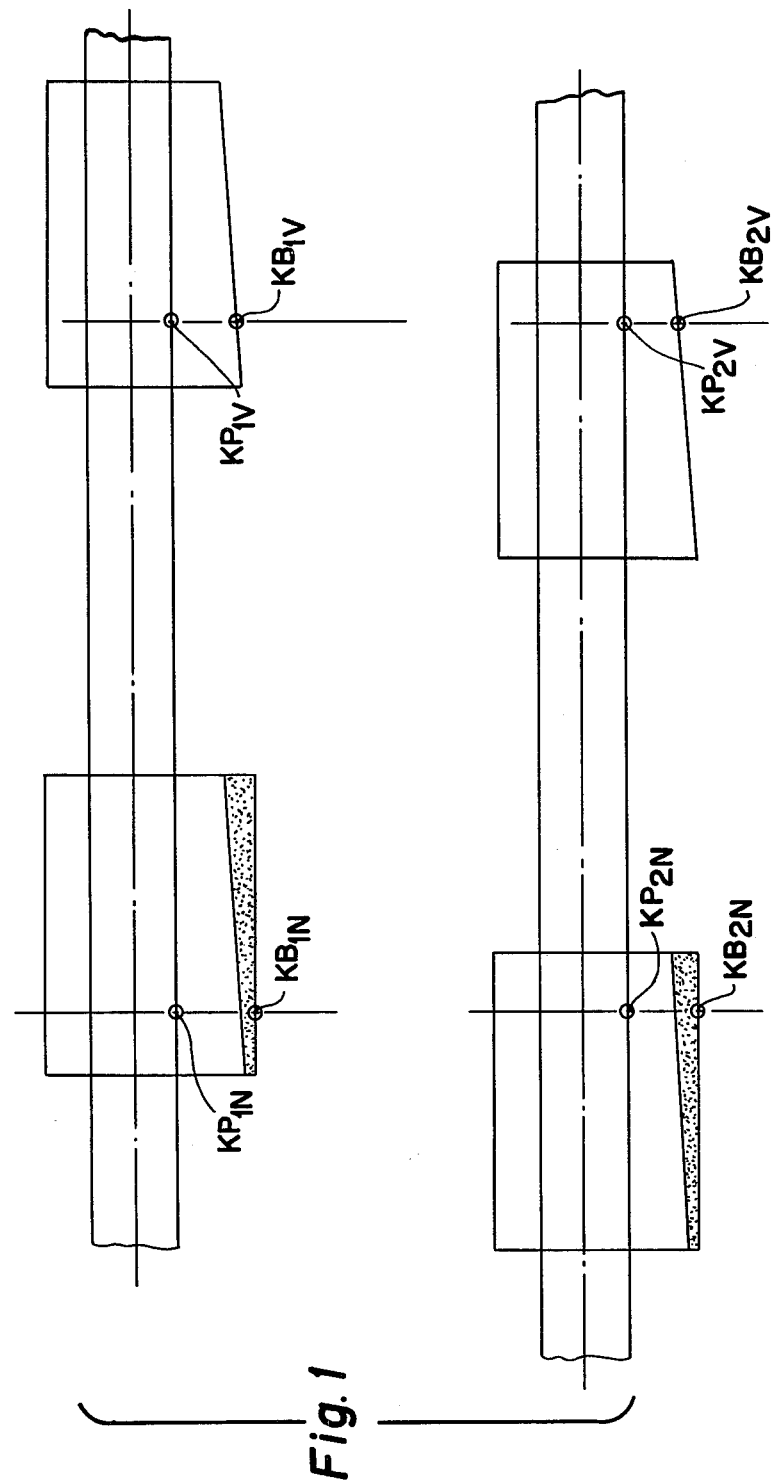
FIG. 1 is the schematic for the detection of measuring values and a definition of the test values according to the formula.
Figure 2:
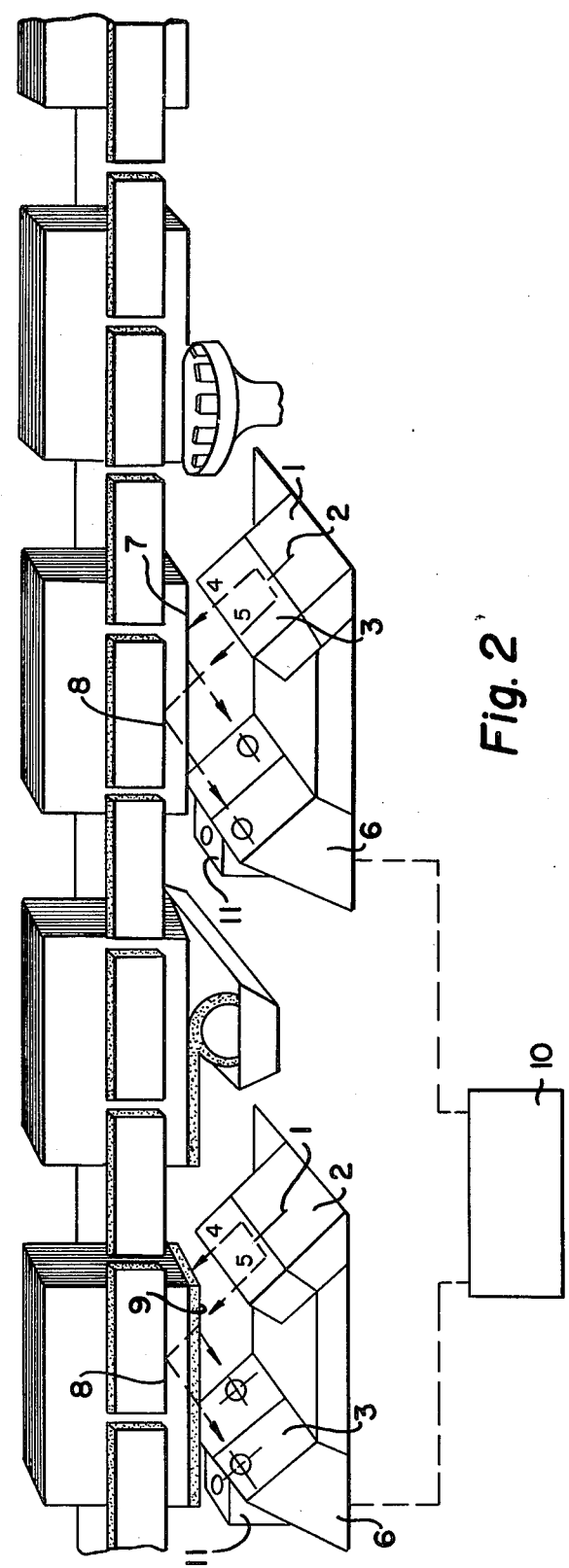
FIG. 2 is the schematic description of the determination of the thickness of adhesive layers on book block backings in the adhesive portion of a machine for the production of books.

In the embodiment, an emitter 1 radiates a convergent beam, for instance a laser beam. With the aid of a beam splitter 3, the beam is divided into two convergent beams 4 and 5. The beam 4 is directed in the fixed measuring position at a definite angle of incidence onto the reference plane of the unglued book block backings 7 and is reflected from there onto the photoelectrical receiver means 6.

Characteristic values are transferred to the amplifying, calculating and reading unit 10 depending on the position of the place of impingement of the light beams.

The same process is repeated in a second stationary measuring position II where the book blocks are directed after the application of the adhesive layer. Beam 4, though, hits the surface of the adhesive layer 9 not the unglued book block backing 7, after the adhesive layer is applied. Evaluation of the characteristic values occurs in the amplifying, computing and reading unit 10 where the result determines an average layer thickness with a precision of about 0.1 mm. The thusly determined adhesive thicknesses, are oppositely compared values in electrical mode and release in case of deviation signals for a manual regulation of the device for applying adhesive, or serve as controlling means for automatic control of the adhesive application.

While passing the position sensor 11, the book blocks release switching impulses which cause the control of the measuring processes or the fixing of the measuring positions, respectively.

We claim:

1. A continuous process for determining the thickness of an adhesive layer on a book block backing immediately after application, comprising the steps of
   (A) measuring the position of the edge of the book block backing,
   (B) measuring the position of a separate reference plane at the same time the position of the book block backing is measured, said measurements in the steps (A) and (B) being accomplished by a pair of convergent light means arranged to reflect from said backing and reference plane respectively,
   (C) applying adhesive to the book block backing,
   (D) measuring the position of the surface of the adhesive,
   (E) measuring the position of the same reference plane from step (B), at the same time the position of the adhesive surface is measured, said measurements in steps (D) and (E) also being accomplished by a pair of convergent light beams, arranged to reflect from said backing and reference plane respectively, and
   (F) subtracting the position of the adhesive surface in step (D) from the position of the edge of the book block backing in step (A) and subtracting the difference of the position of the reference plane in step (E) from the position of the reference plane in step (B), to determine the thickness of the adhesive layer within about 0.1 mm.

2. The process of claim 1 in which the individual measuring steps are separately repeated and the two such measurements determined in step (F) are averaged to determine an average thickness of the adhesive layer.

3. The process of claim 2 in which translational passage of the continuously moving book block over a position sensor serves to signal operation of the requisite measuring steps.

4. The process of claim 3 in which measurements are taken by the convergent beams of light impinging at a definite angle of incidence at each measuring position and reflecting back to a photoelectrical receiver device.

5. The process of claim 4 in which said convergent beams of light are capable of being deflected together in a similar manner to determine the thickness of the adhesive layer across the direction of motion of the book block.

6. The process of claim 5 in which the reference planes measured in steps (B) and (E) are the lower edges of a supporting and conveying means for the various book block backings.

7. The process of claim 6 in which the convergent beams of light in each individual step are produced from a laser beam source with the aid of a beam splitter.

8. A continuous process for determining the thickness of an adhesive layer on a book block backing, wherein the book backing is coated with an adhesive layer between a first measuring station and a second measuring station by conveyor means, said method comprising measuring the position of the book backing at two positions in its course of travel and a reference plane fixed with respect to the book backing, at said first measuring station, measuring the position of the surface of adhesive on said book backing at first and second positions and of said reference plane at said second measuring station, said positions being determined by reflecting beams of light from said book backing, adhesive layer and reference plane, and determining the difference between the average of the positions of the book backing and adhesive layer surface, with respect to the reference plane, at the two positions, for determining the thickness of the adhesive layer.

9. The process of claim 8 wherein said steps of determining the position of the reference plane comprise determining the position of the conveying means at the first and second stations.

* * * * *